(12) United States Patent
Tsuruoka

(10) Patent No.: US 9,467,386 B2
(45) Date of Patent: Oct. 11, 2016

(54) COMMUNICATION TERMINAL AND COMMUNICATION METHOD

(71) Applicant: FUJITSU LIMITED, Kawasaki-shi, Kanagawa (JP)

(72) Inventor: Tetsumei Tsuruoka, Ichikawa (JP)

(73) Assignee: FUJITSU LIMITED, Kawasaki (JP)

( * ) Notice: Subject to any disclaimer, the term of this patent is extended or adjusted under 35 U.S.C. 154(b) by 121 days.

(21) Appl. No.: 14/573,838

(22) Filed: Dec. 17, 2014

(65) Prior Publication Data

US 2015/0195210 A1 Jul. 9, 2015

(30) Foreign Application Priority Data

Jan. 6, 2014 (JP) .................. 2014-000416

(51) Int. Cl.
| | |
|---|---|
| H04L 12/26 | (2006.01) |
| H04L 12/825 | (2013.01) |
| H04L 1/18 | (2006.01) |
| H04L 12/801 | (2013.01) |
| H04L 12/815 | (2013.01) |
| H04L 12/841 | (2013.01) |
| H04L 12/807 | (2013.01) |

(52) U.S. Cl.
CPC ............. *H04L 47/266* (2013.01); *H04L 1/188* (2013.01); *H04L 1/1835* (2013.01); *H04L 47/11* (2013.01); *H04L 47/12* (2013.01); *H04L 47/225* (2013.01); *H04L 47/27* (2013.01); *H04L 47/283* (2013.01)

(58) Field of Classification Search
CPC ..... H04L 47/266; H04L 47/11; H04L 47/12; H04L 47/225; H04L 47/283; H04L 47/27

USPC .............................................. 370/235–236.2
See application file for complete search history.

(56) References Cited

U.S. PATENT DOCUMENTS

| | | | |
|---|---|---|---|
| 2004/0148387 A1 | 7/2004 | Sethi | |
| 2009/0010165 A1* | 1/2009 | Kim | ................. H04L 47/10 370/235 |
| 2012/0106373 A1 | 5/2012 | Gaal et al. | |
| 2012/0106376 A1 | 5/2012 | Kikkawa et al. | |
| 2014/0355442 A1* | 12/2014 | Isobe | ................. H04L 69/16 370/235 |

FOREIGN PATENT DOCUMENTS

| | | |
|---|---|---|
| JP | 2004-229306 | 8/2004 |
| JP | 2010-187292 | 8/2010 |
| JP | 2012-95190 | 5/2012 |

\* cited by examiner

*Primary Examiner* — Phuc Tran
(74) *Attorney, Agent, or Firm* — Staas & Halsey LLP

(57) ABSTRACT

A communication terminal is configured to control a packet transmission amount based on the number of packets transmittable to a destination device without receiving an acknowledgement signal (ACK) transmitted from the destination device to indicate its acceptance for the packets transmitted from the communication terminal, the communication terminal includes a processor configured to execute a procedure, the procedure includes determining whether it is appropriate timing for packet transmission, based on an amount of tokens which are accumulated according to a target transmission rate, the transmission timing including timing when receiving the ACK and timing when a timer value updated at each timing of the packet transmission executed in the communication terminal expires, and transmitting a packet at the transmission timing in which it is determined that transmission is appropriate.

14 Claims, 17 Drawing Sheets

COMMUNICATION TERMINAL AND COMMUNICATION METHOD

CROSS-REFERENCE TO RELATED APPLICATION

This application is based upon and claims the benefit of priority of the prior Japanese Patent Application No. 2014-000416, filed on Jan. 6, 2014, the entire contents of which are incorporated herein by reference.

FIELD

The embodiments discussed herein are related to a communication terminal and a communication method.

BACKGROUND

In the recent network, as represented by the Internet, data is transmitted as packets in the network layer and the lower layers. Then, the packets are transmitted to a packet destination address as datagrams whose delivery to the address is not guaranteed. On the other hand, a function to guarantee packet delivery to a destination address is provided in the layers above the network layer, and the function is provided mainly by using transport layer services as represented by the transport control protocol (TCP) (see Japanese Laid-open Patent Publication No. 2010-187292). Hereinafter, each end-to-end communication using the transport layer service is referred to as a "connection" in some cases.

In the TCP, a "window" is introduced to increase transfer performance. The "window" is the number of packets or a data amount which can be transmitted without waiting for an acknowledgement (ACK). In the TCP, a flow control (window flow control) using this window is performed. More specifically, in the TCP, a transmittable data amount without receiving an acknowledgement is fixed up to a buffer capacity of a receiver (in other words, a reception buffer size) and a transmission buffer capacity (in other words, a transmission buffer size) desired for holding transmission data including retransmission data. Then, an occurrence of a packet overflow at the receiver or a suspension of data transfer during a period until an acknowledgement is received are avoided as much as possible. This can improve the throughput unless the packet loss detection at the receiver occurs.

In addition, in the TCP, transmission rate control is performed utilizing the foregoing mechanism of the flow control. More specifically, the window size (typically shown in unit of the number of packets or a data amount) is dynamically adjusted to control the transmission rate. This is because the window size is a data mount transmittable within a round-trip time (RTT) and the transmission rate can be expressed by the following equation.

Transmission rate=Window size/RTT

These protocols have to be assumed to be used in various networks. For this reason, communications in the networks utilizing these protocols are achieved by using various devices and applications. Accordingly, the packets transmitted from a transmitter to a receiver may pass through links having various delay characteristics and bandwidths. In addition, some links may be shared among multiple communication traffics. For this reason, when packets are transmitted considering only for convenience of the transmitter and the receiver, there may cause a situation in which the traffic amount exceeds the link bandwidth or the network capacity, with the result that buffer overflow at is occurred or packet discarding for protecting the network is performed. Furthermore, packets are retransmitted due to the discard. In the worst case, network would go down. These phenomena decrease the quality and effective bandwidth of the network.

To address them, "congestion control" is introduced in the TCP. The "congestion control" is control of adjusting a transmission rate, that is, to control an amount of packets to be transmitted based on the degree of network congestion or changes of the link capacity. In the congestion control, the amount of packets to be transmitted is controlled by a "congestion window". In other words, the "congestion window" is a window which reflects the degree of network congestion or the changes of the link capacity. In the following description, the congestion window is sometimes abbreviated as CWND.

In the congestion control, the transmitter transmits a packet upon reception of an acknowledgement. In other words, when the acknowledgement is received, the transmission data amount for which acknowledgements are waited decrease by the amount indicated by the acknowledgement, more specifically, by a "reception-acknowledged data amount" indicated by the acknowledgement as a data amount newly received by the receiver, so that new packet can be transmitted. Accordingly, a trigger of the packet transmission is reception of an acknowledgement. Such packet transmission using an acknowledgement as a trigger is sometimes referred to as "ACK clocking".

In the congestion control, the CWND size is increased or decreased in order to increase or decrease the transmission rate. Accordingly, remainder of the window in relation to the CWND size is shown by the summation of an amount of change at the CWND size and the "reception-acknowledged data amount" indicated by the acknowledgement. This remainder thus calculated shows an amount of transmittable. In other words, at the timing of increasing the CWND size, packets are transmitted at a transmission rate obtained by adding the CWND increase amount to the rate corresponding to the acknowledgement. At the time of slow start to be described later, such addition is made at every acknowledgement, and this is a typical case in which the TCP causes high traffic burstiness.

Here, the congestion control is specifically described by using a method called "reno" as an example, which is a typical method in the congestion control. FIG. 1 is a graph for illustrating conventional congestion control.

As illustrated in FIG. 1, an initial mode is set to be a slow start mode and the CWND size is set to be a minimum value. Then, every time an acknowledgement is received, the CWND size is increased by one packet. In other words, in the slow start mode, packets are transmitted by a double rate of the rate for the received acknowledgement, so that the transmission rate in the current RTT is the double of the transmission rate in the previous RTT.

If a packet loss E101-1 is detected by a duplicate acknowledgement (duplicate ACK) which is an event where the acknowledgement having the same acknowledgement number (ACK number) is received three times, the slow start mode is transitioned to a congestion avoidance mode. Then, the latest value of a slow start threshold (ssthresh) is set to be a half of the initial setup value, and the CWND size is also set according to the latest value of the slow start threshold. Every time an acknowledgement for a data amount equivalent to the current setup value of this CWND size is received, the CWND size is increased by one packet. In FIG. 1, a packet loss E101-2 is detected once again in response to the duplicate acknowledgement and the congestion avoidance mode is repeated.

As illustrated in FIG. 1, when a response timeout (RTO) E102 is detected, the latest value of the slow start threshold is set to be a half of the setup value at that time and the congestion window is set to be a minimum value. After that, the state transitions to the slow start mode. When the congestion window is increased to reach the slow start threshold, the slow start mode is transitioned to the congestion avoidance mode. The congestion control is performed as described above.

SUMMARY

According to an aspect of the invention, a communication terminal is configured to control a packet transmission amount based on the number of packets transmittable to a destination device without receiving an acknowledgement signal (ACK) transmitted from the destination device to indicate its acceptance for the packets transmitted from the communication terminal, the communication terminal includes a processor configured to execute a procedure, the procedure includes determining whether it is appropriate timing for packet transmission, based on an amount of tokens which are accumulated according to a target transmission rate, the transmission timing including timing when receiving the ACK and timing when a timer value updated at each timing of the packet transmission executed in the communication terminal expires, and transmitting a packet at the transmission timing in which it is determined that transmission is appropriate.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
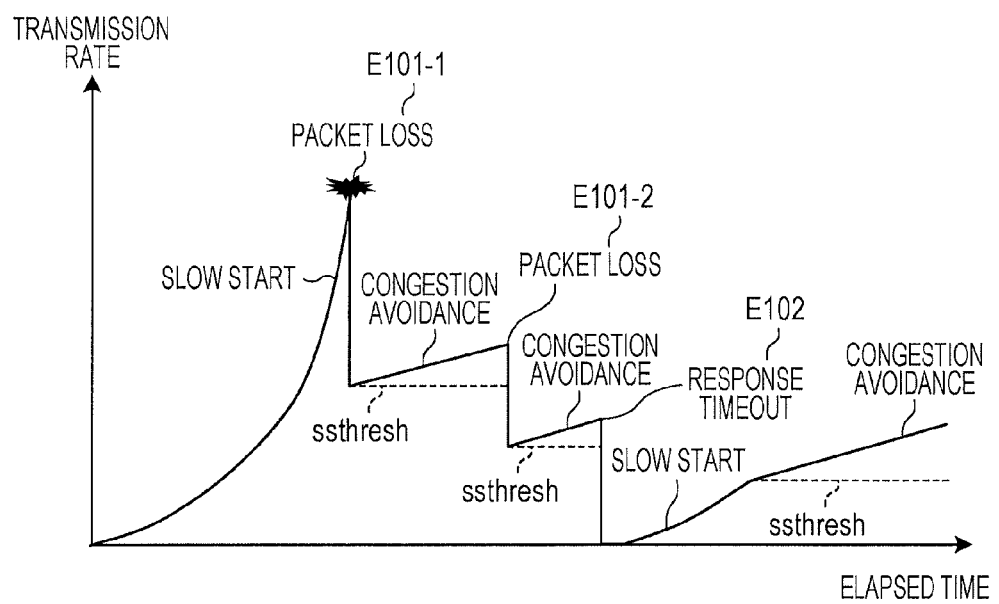
FIG. 1 is a graph for illustrating a conventional congestion control.

According to the conventional congestion control illustrated in FIG. 1, there is a possibility that a desired transmission rate is not obtained due to phenomena as described as examples below.

Figure 2:
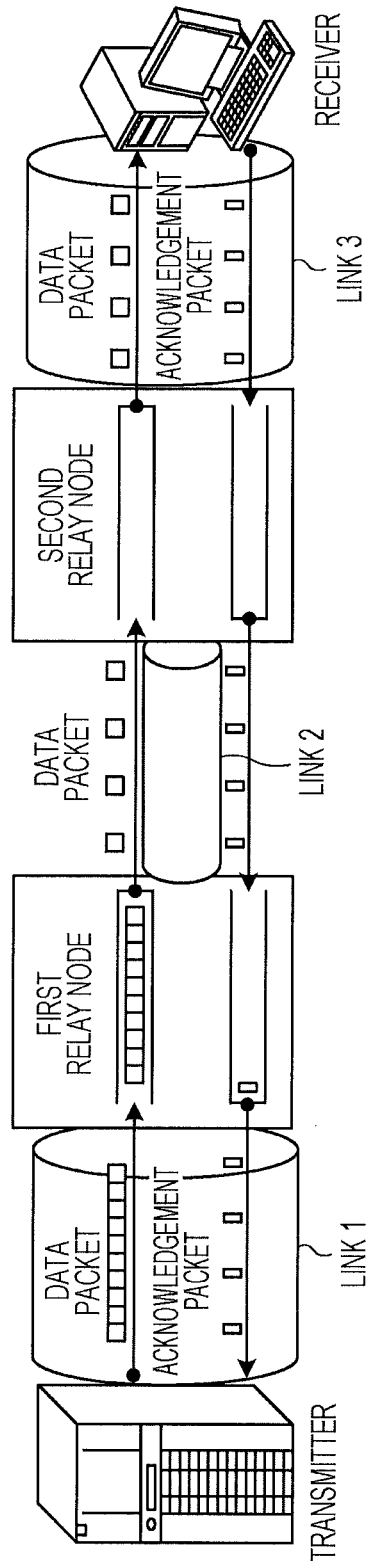
FIG. 2 is a diagram illustrating a state of data transfer between a transmitter and a receiver.
Figure 3:
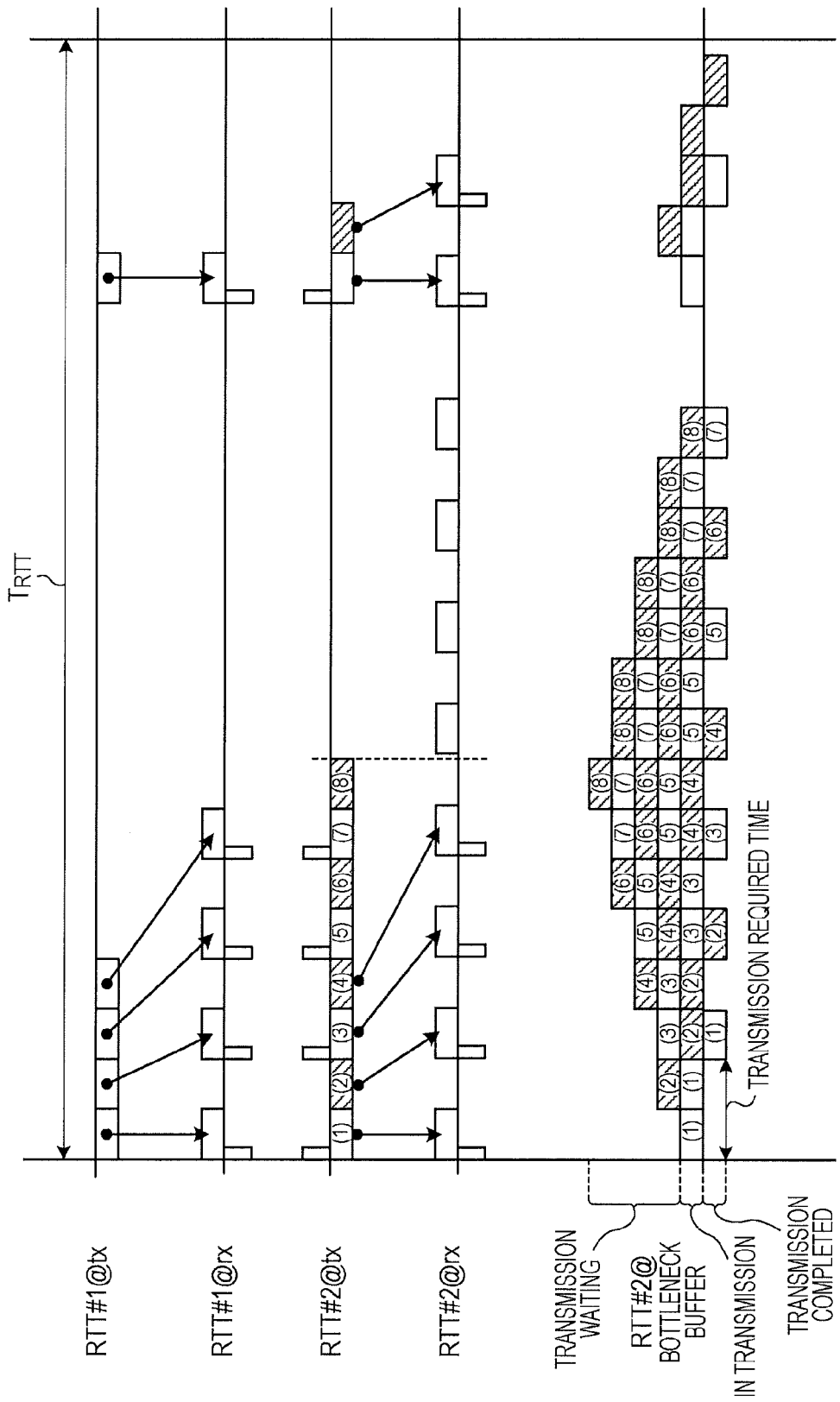
FIG. 3 is a diagram illustrating a state where transmission standby packets are enqueued in a buffer in a relay node.

FIG. 2 is a drawing illustrating a state of data transfer between a transmitter and a receiver. Particularly, FIG. 2 illustrates a case where two relay nodes exist between the transmitter and the receiver. Also, FIG. 3 is a drawing illustrating a state where transmission standby packets are enqueued in a buffer of a relay node.

In FIG. 2, the transmitter and a first relay node are connected with each other by a link 1, the first relay node and a second relay node are connected with each other by a link 2, and the second relay node and the receiver are connected with each other by a link 3. The packets transmitted from the transmitter pass through the link 1, the first relay node, the link 2, the second relay node, and the link 3 in this order and are received by the receiver. The acknowledgements for the packets received by the receiver pass through the link 3, the second relay node, the link 2, the first relay node, and the link 1 in the reverse order and are received by the transmitter.

It is assumed here that a bandwidth of the link 1 and a bandwidth of the link 3 are equal to each other and a bandwidth of the link 2 is narrower than the bandwidth of the link 1. In this case, when the transmitter transmits packets unlimitedly, the packets pass through the link 1 at first intervals corresponding to the bandwidth of the link 1 and are received by the first relay node. In contrast, the first relay node can send the packets to the link 2 only at second intervals longer than the first intervals, because the link 2 has a lower bandwidth than the link 1. As a result, the transmission standby packets are enqueued in the buffer of the first relay node.

The packets pass in the link 2 at the second intervals and the packets are received by the second relay node. Then, the second relay node sends out the packets at the second intervals according to the packet reception intervals. The packets pass in the link 3 at the second intervals and the packets are received by the receiver.

Then, the receiver sends out acknowledgements for the received packets to the link 3 at the second intervals according to the packet reception intervals. The acknowledgements sent out at the second intervals pass through the link 2 and the link 1 while keeping the intervals and are received by the transmitter. Here, the narrowest bandwidth link in a path like the link 2 is sometimes called as a "bottleneck link". When the transmitter receives the packets with a bottleneck bandwidth or a wider bandwidth, a phenomenon occurs in which the packets are enqueued in the relay node. Here, the rate corresponding to the reception-acknowledged data amount indicated by the acknowledgement is referred to as an "ACK rate" below.

Also, as illustrated in FIG. 3, when it is assumed that the transmitter can transmit four packets at the beginning of a round trip time (RTT) #1, the transmitter transmits four packets at intervals determined according to the bandwidth of the link 1 (in other words, the first intervals) (see, RTT#1@tx in FIG. 3). Then, as described above, due to the narrow bandwidth of the bottleneck link, the intervals for the four packets are widened to the second intervals and the four packets are received by the receiver at the second intervals (see the upper part of RTT#1@rx in FIG. 3). In response to the received packets, the receiver sends out four acknowledgements at the second intervals (see the lower part of RTT#1@rx in FIG. 3). Then, at RTT #2 which is the next round trip time after the RTT #1, the four acknowledgements sent out from the receiver reach the transmitter at the second intervals corresponding to the bandwidth of the bottleneck link (see upper part of RTT#2@tx in FIG. 3). According to the foregoing congestion control algorism for the slow start mode, one packet is transmittable in response to the acknowledgement, and one more packet is further transmittable because the CWND size is expanded in response to that acknowledgement (see lower part of RTT#2@tx in FIG. 3). It is to be noted that in the lower part of the RTT#2@tx in FIG. 3, a not-hatched square represents a packet transmitted in response to the acknowledgement, while a hatched square represents a packet transmittable due to expansion of the CWND size in response to the acknowledgement.

Figure 4:
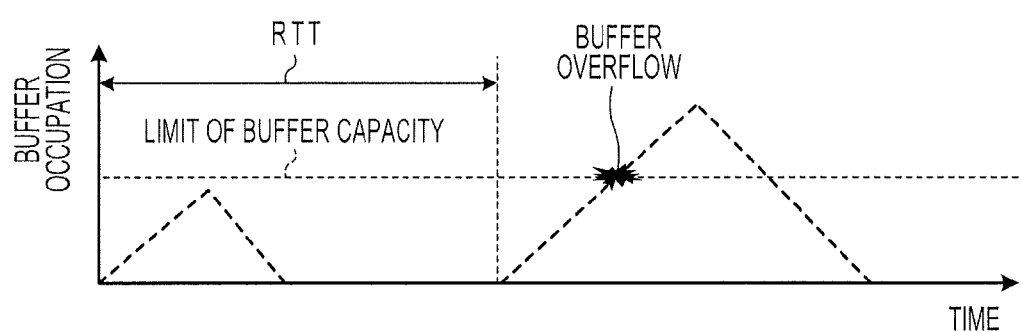
FIG. 4 is a graph illustrating changes of the occupancy level of a bottleneck buffer over time.

The lower part of FIG. 3 illustrates a state where the packets transmitted as described above are enqueued in the bottleneck buffer (in other words, corresponding to the buffer of the first relay node). Here, the transmitter transmits packets with the bandwidth of the bottleneck link or a wider bandwidth as described above, which may cause an increase of buffer occupancy at the relay node. As is clear from the occupancy level of the bottleneck buffer, amount of packets corresponding to an excess of the transmission rate in the transmitter over the bandwidth of the bottleneck link are added to the buffer occupancy during the period of RTT #2. In other words, since the ACK rate is equivalent to the bandwidth of the bottleneck link, the excess herein is represented by the "hatched squares" sent out due to the expansion of the CWND size and the buffer occupancy level is increased at timing when a "hatched square" arrives. As illustrated in FIG. 4, if the size of the bottleneck buffer is not sufficiently large, the occupancy level may reach a buffer size limit and the excess packets are discarded (hereinafter, it is sometimes referred to as "buffer overflow"). FIG. 4 is a graph illustrating changes of the occupancy level of the bottleneck buffer over time. It is to be noted that this overflow in the buffer is determined by a relationship between the expansion factor of the CWND size and the free space of the buffer during the period in which the acknowledgements are sent out continuously at the second intervals. Accordingly, this may happen even if the average transmission rate during RTT is lower than the bandwidth of the bottleneck link.

Figure 5:
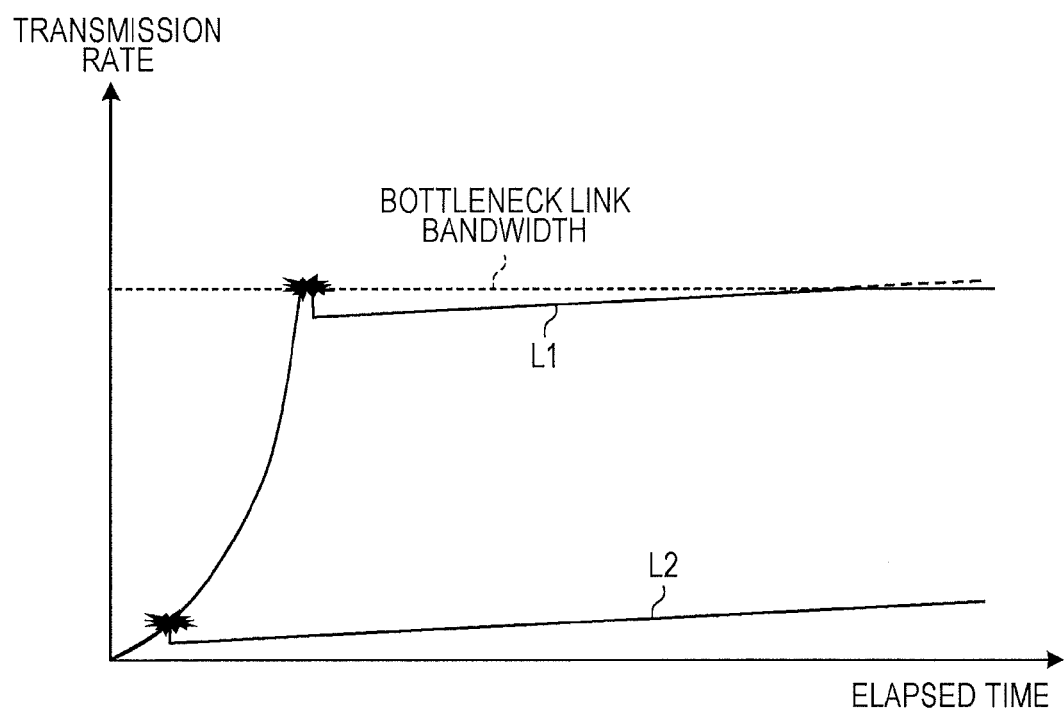
FIG. 5 is a graph for illustrating a typical transmission rate with occurrence of a congestion detection.

When the buffer overflow occurs in the slow start mode, the mode transitions to the congestion avoidance mode as described above. In the congestion avoidance mode, the increasing pace of the transmission rate is significantly slower than in the slow start mode. Even when the increasing pace of the transmission rate falls down as described above, a buffer overflow, if occurring in the state where the transmission rate is increased to near the bottleneck bandwidth as illustrated by line L1 in FIG. 5, is not serious problem. In contrast, a buffer overflow, if occurring in a state where the transmission rate is significantly smaller than the bottleneck bandwidth as illustrated by line L2 in FIG. 5, makes a time for the transmission rate to reach the bottleneck bandwidth long. In this case, even if a bandwidth available for a target communication is exist in the bottleneck link, there is a high possibility that the target communication is terminated before its transmission rate reaches the bandwidth. As a result, there is a high possibility that communications have to be made with a transmission rate lower than the highest possible transmission rate. FIG. 5 is a graph for illustrating a typical transmission rate with occurrence of a congestion detection It is to be noted that such a situation may happen also when a link is shared among multiple traffics. In addition, in a case where acknowledgements are stagnated by some reason, a similar situation may occur because the transmitter receives the concentrative acknowledgements and transmits highly bursty packets.

Hereinafter, a communication terminal and a communication method which are disclosed in this application are described in detail based on the drawings. It is to be noted that the embodiments are not intended to limit the communication terminal and the communication method which are disclosed in this application. Also, same reference numerals are given to denote components having same functions in embodiments and the duplicated description is omitted. In addition, same reference numerals are given to denote same processing operations in the embodiments and the duplicated description is omitted.

First Embodiment

[Outline of Communication System]

Figure 6:
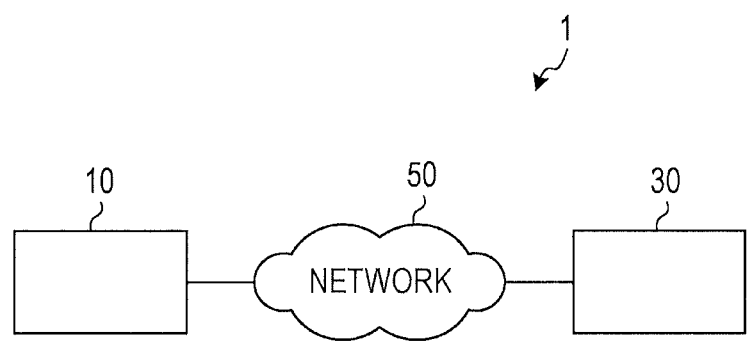
FIG. 6 is a diagram illustrating an example communication system according to a first embodiment.

FIG. 6 is a diagram illustrating an example communication system according to a first embodiment. In FIG. 6, a communication system 1 includes communication terminals 10, 30 and a network 50. The communication terminal 10 transmits packets to the communication terminal 30. Also, the communication terminal 10 controls a transmission amount of packets to be transmitted within a round trip time using "congestion window". A protocol which is used for controlling the packet transmission amount using congestion window is TCP, for example. Hereinafter, the description is given on the assumption that a protocol to be used is TCP. Then, the communication terminal 30 transmits an acknowledgement to the communication terminal 10 when the communication terminal 30 receives the packet from the communication terminal 10.

Also, the communication terminal 10 determines whether the packet transmission is appropriate based on the amount of "token" accumulated according to a "target transmission rate" for every "candidate transmission timing". Here, the "candidate transmission timing" includes timing when the communication terminal 10 receives an acknowledgement transmitted from the communication terminal 30 and timing when a timer value updated at each "transmission executing timing" of the packet by the communication terminal 10 expires. In addition, the "target transmission rate" is a target value of an average transmission rate of the communication terminal 10. For example, the "token" is a token referred in the "token bucket method". The "transmission executing timing" is timing when the communication terminal 10 actually transmits a packet.

Specifically, the communication terminal 10 at least performs the following processing. When receiving the acknowledgement, the communication terminal 10 checks the amount of tokens. When the amount of tokens is equal to or larger than a "transmission executing minimum value", the communication terminal 10 transmits packets according to the tokens. At this time, the communication terminal 10 sets a timer reference value (in other words, a timer initial value) to a timer. Also, when the packets are transmitted, the communication terminal 10 decrements the tokens by the transmitted packet amount. The amount of tokens consumed at one transmission executing timing is limited to the specific value (hereinafter referred as "maximum limit of token consumption at once"). In other words, a packet shaping technique is adopted. When the communication terminal 10 transmits packets as a result of receiving an acknowledgement before the timer expires and checking the amount of tokens, the communication terminal 10 updates the value of the timer to a timer reference value. When the timer expires, the communication terminal 10 also checks the amount of tokens. When the amount of the tokens is equal to or larger than the transmission execution lower limit value, the packets are transmitted based on the amount of tokens. In this case, the communication terminal 10 also sets the timer reference value to the timer.

Here, even when determining not to transmit packets as a result of receiving the acknowledgement before the timer expires and checking the amount of tokens, the communication terminal 10 may update the timer value to the timer reference value.

With the above-described configuration, to level the transmission executing timing based on the tokens, one part of the multiple acknowledgement reception timing may be used as transmission executing timing, and the rest may be used as transmission not-executing timing as well as timing when the timer expires may be used as transmission executing timing in place of the transmission not-executing timing. Accordingly, the packet transmission burstiness may be suppressed. Also, since the packet transmission amount at the transmission not-executing timing may be controlled, so that the packet transmission burstiness may be further suppressed. As a result, the possibility of causing buffer overflow in the bottleneck may be reduced, so that the transmission rate may be improved. It is to be noted that one part of the acknowledgement reception timing is used as the transmission executing timing and the timer expiration timing is used as the transmission executing timing, so that a frequency of generating interruption processing may be suppressed as compared with the case when the transmission executing timing is controlled only by the timer. In other words, the processing load in the communication terminal 10 may be reduced.

[Configuration of Communication Terminal]

Figure 7:
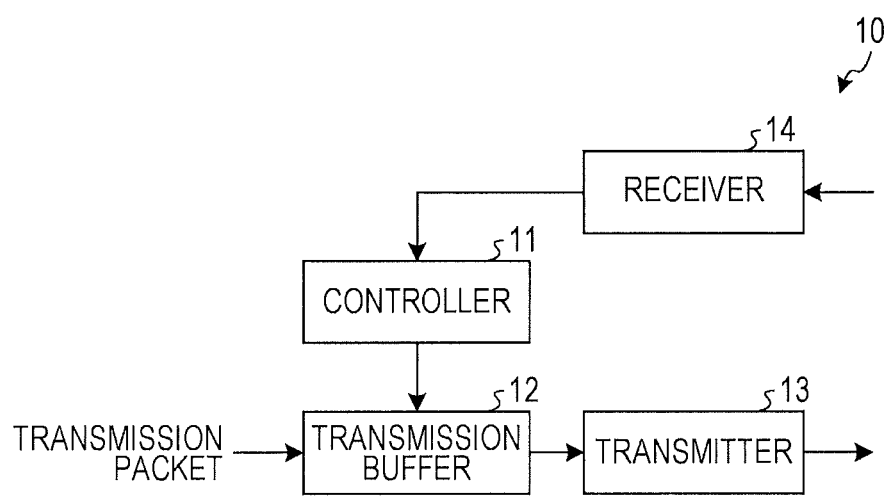
FIG. 7 is a block diagram illustrating an example communication terminal according to the first embodiment.

FIG. 7 is a block diagram illustrating an example communication terminal according to the first embodiment. FIG. 7 particularly illustrates a configuration example of the communication terminal 10 on a packet transmission side. In FIG. 7, the communication terminal 10 has a controller 11, a transmission buffer 12, a transmitter 13, and a receiver 14.

The transmission buffer 12 inputs transmission packets and temporarily holds them. After that, the transmission buffer 12 outputs the holding transmission packets to the transmitter 13 according to the control by the controller 11.

The transmitter 13 performs predetermined transmission processing on the transmission packets outputted from the transmission buffer 12 and sends out the transmission packets after the transmission processing to the network 50.

The receiver 14 receives the signals transmitted from the communication terminal 30 via the network 50, and performs predetermined reception processing on the received signals. The receiver 14 outputs, to the controller 11, an acknowledgement included in the signals on which the reception processing is performed.

The controller 11 executes transmission control on the transmission packets.

For example, the controller 11 adjusts the above-described congestion window.

Also, for example, the controller 11 determines whether the packet transmission is appropriate based on the amount of tokens (in other words, tokens) which are accumulated according to a target transmission rate for each of candidate transmission timings. Specifically, when an acknowledgement is received from the receiver 14, the controller 11 checks the amount of tokens and, when the amount of tokens is equal to or larger than the "transmission executing lower limit value", the controller 11 causes the transmission buffer 12 to output the packets based on the amount of tokens. At that time, the controller 11 sets a timer reference value to a timer (unillustrated). Also, when packets are transmitted, the controller 11 reduces the amount of tokens by the amount of the transmitted packets. The amount of tokens consumed at one transmission executing timing is limited to be up to the "maximum limit of token consumption at once". When the controller 11 transmits packets as a result that the acknowledgement is received before the timer expires and the amount of tokens is checked, the controller 11 updates the value of the timer to a timer reference value. Also, when the timer expires, the controller 11 checks the amount of tokens. When the amount of tokens is equal to or larger than the transmission executing lower limit value, the controller 11 causes the transmission buffer 12 to output packets based on the amount of tokens. In this case, the controller 11 also sets a timer reference value to the timer. It is to be noted that when the controller 11 receives an acknowledgement before the timer expires and checks the amount of tokens. When the amount of tokens is less than the "transmission executing lower limit value", the controller 11 determines that packets are not transmitted. In this case again, the controller 11 may update the value of the timer to a timer reference value.

Figure 8:
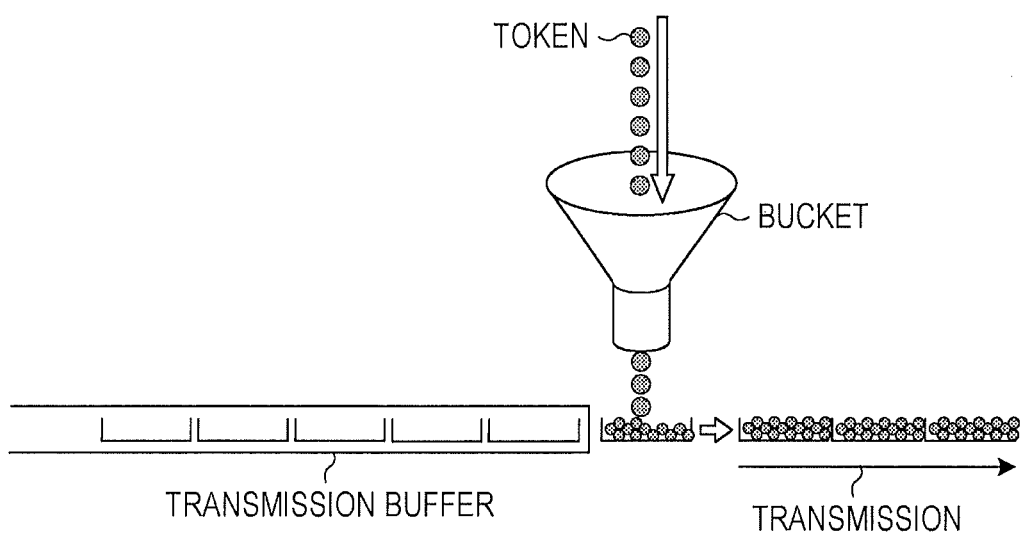
FIG. 8 is a diagram for illustrating a token bucket method.

Also, for example, the controller 11 controls tokens. For example, the controller 11 performs control on tokens based on the "token bucket method" illustrated in FIG. 8. FIG. 8 is for illustrating the token bucket method. As illustrated in FIG. 8, the controller 11 has logical buckets in which tokens are capable of being accumulated up to the "maximum limit of token consumption at once". Moreover, tokens are accumulated at a pace based on the above-described target transmission rate. When it is determined that packet transmission is appropriate at candidate transmission timing, the controller 11 transmits the number of packets according to the amount of tokens which are accumulated in the bucket. After that, the controller 11 subtracts the amount of tokens equivalent to the data amount of transmitted packets from the amount of tokens. It is to be noted that the amount of tokens may be calculated at the candidate transmission timing.

It is to be noted that the controller 11 may calculate the above-described target transmission rate based on a limit value of the congestion window and round trip time. For example, the controller 11 calculates the target transmission rate by dividing the limit value of the congestion window by the roundtrip time. The limit value of the congestion window may be a total amount of the data amount about the packets which have been already transmitted and whose acknowledgement has not been received yet. Also, the round trip time is measured by the controller 11. The timer (unillustrated) may manage the above-described timer value as well as the response timeout (RTO). In other words, the timer (unillustrated) may be shared both in the management processing for the timer value and the management processing for the response timeout (RTO).

In addition, the controller 11 performs packet retransmission control.

[Example Operation of Communication Terminal]

Figure 9:
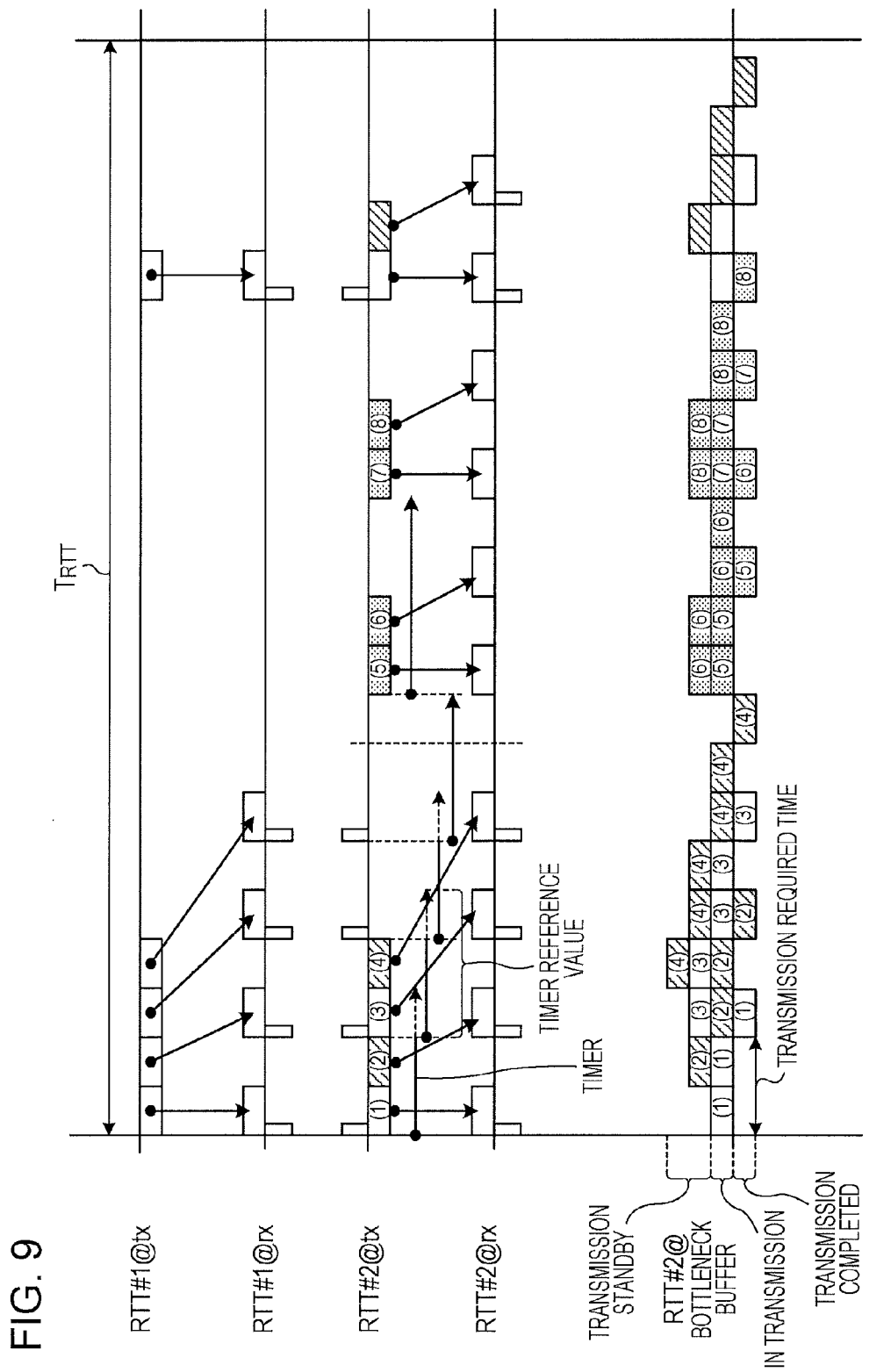
FIG. 9 is a diagram for illustrating an example processing operation performed by a communication terminal according to the first embodiment.
Figure 10:
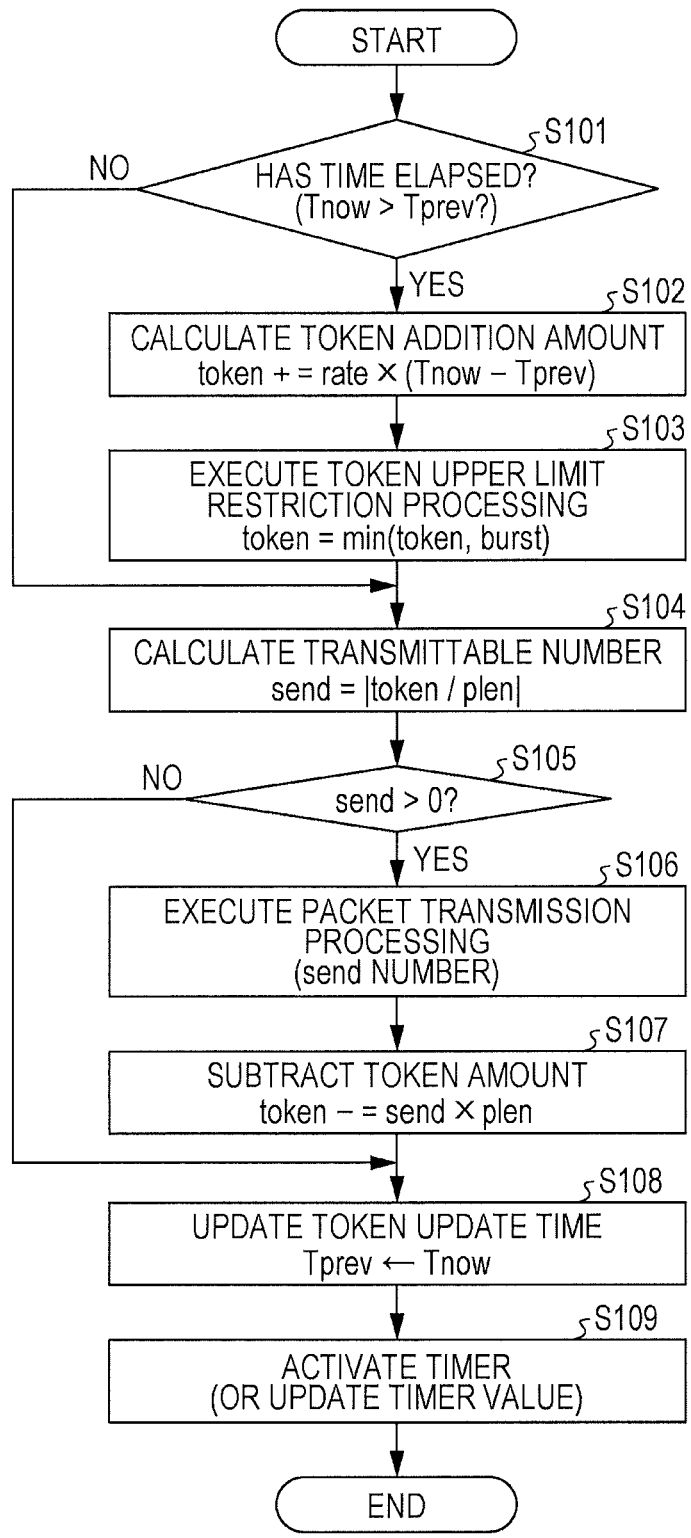
FIG. 10 is a flowchart for illustrating an example processing operation performed by the communication terminal according to the first embodiment.
Figure 11:
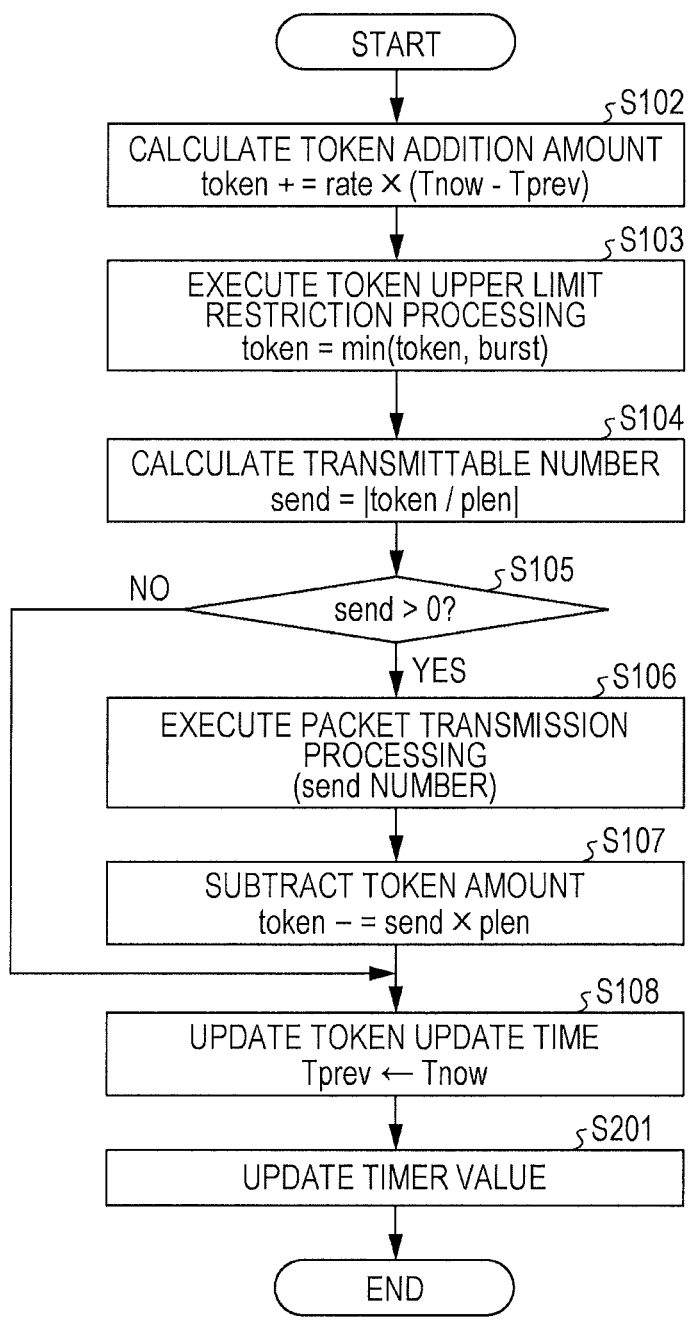
FIG. 11 is a flowchart for illustrating an example processing operation performed by the communication terminal according to the first embodiment.

An example processing operation of the communication terminal 10 with the above-described configuration is described. FIG. 9 is a diagram for illustrating an example processing operation of the communication terminal according to the first embodiment. FIG. 10 and FIG. 11 are flowcharts for illustrating an example processing operation by the communication terminal according to the first embodiment. FIG. 10 illustrates a flow which is executed when an acknowledgement is received and FIG. 11 illustrates a flow which is executed when the timer expires.

In FIG. 9, processing at RTT#1 which is performed by the communication terminal 10 is similar to the processing described in FIG. 3.

At RTT#2, the controller 11 of the communication terminal 10 starts the flow of FIG. 10 when an acknowledgement is received.

The controller 11 compares the previous time (Tprev) of updating the amount of token with the current time (Tnow) to determine if time has elapsed since the previous update time (operation S101).

When the time has elapsed (Yes at operation S101), the controller 11 calculates a token addition amount (token+) (operation S102). For example, the token addition amount is calculated by the following equation.

$$Token+=rate\times(Tnow-Tprev)$$

After that, the controller 11 calculates a virtual token amount by adding the calculated token addition amount to a residual amount of tokens at the previous update time. However, as described above, the amount of tokens is limited by the maximum limit of token consumption at once (burst).

For this reason, the controller 11 executes processing of limiting a token upper limit (operation S103). For example, the controller 11 compares the calculated virtual token amount with the maximum limit of token consumption at once and uses the smaller one as an actual token amount.

Then, the controller 11 uses a quotient which is obtained by dividing the actual token amount by a packet length (plen) as the number of transmittable packets (send) (operation S104). It is to be noted that when it is determined that the time has not elapsed yet (No at operation S101), operation S104 is performed.

After that, the controller 11 determines whether the transmittable number (send) is larger than 0 (operation S105).

When the transmittable number (send) is larger than 0, in other words, the transmittable number is equal to or larger than 1 (Yes at operation S105), the controller 11 executes packet transmission processing for the amount of the transmittable number (operation S106).

After that, the controller 11 subtracts the token amount according to the packet transmission amount from the actual token amount (operation S107). Accordingly, the token residual amount may be calculated.

Then, the controller 11 updates the token update time by the current time (operation S108). It is to be noted that when the transmittable number is equal to or lower than 0 (No at operation S105), operation S108 is executed.

Also, the controller 11 sets a timer reference value to the timer and activates the timer (operation S109). It is to be noted that when the timer has been already activated, the timer value at that time point is updated by the timer reference value.

The flow of FIG. 10 is executed for each of the first to fourth acknowledgements at RTT#2 in FIG. 9.

Thereafter, the timer updated when the fourth acknowledgement at RTT#2 in FIG. 9 is received has expired without receiving the acknowledgement interruptedly. When the timer has expired, the controller 11 starts the flow of FIG. 11.

The processing of operations S102 to S108 in FIG. 11 is same as that of operations S102 to S108 in FIG. 10.

The controller 11 updates the timer value by the timer reference value (operation S201).

Figure 12:
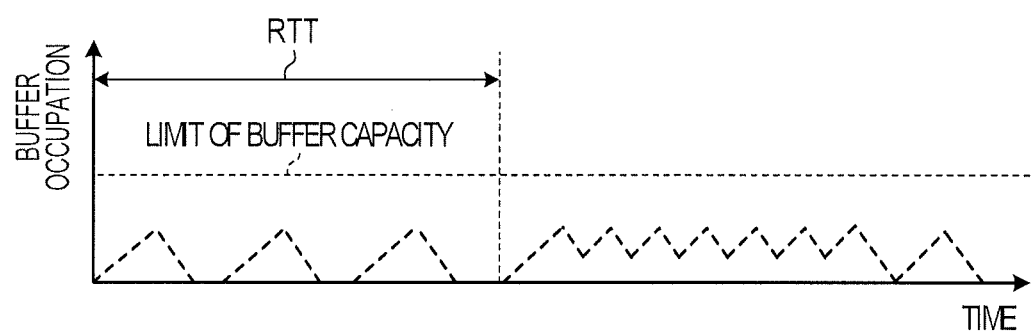
FIG. 12 is a graph illustrating changes in a bottleneck buffer occupancy over time.

Here, it is clear that, as illustrated in the lowest portion in FIG. 9 and in FIG. 12, the controller 11 executes the above-described operation, so that the accumulated packet amount at each time point in the bottleneck buffer is reduced. This is because the packet transmission executing timing is dispersed by the control using the timer. FIG. 12 is a graph illustrating changes in the bottleneck buffer occupancy over time.

As described above, according to the present embodiment, the communication terminal 10 controls the transmission amount of packets which are transmitted within the round trip time through the congestion window. In addition, in the communication terminal 10, the controller 11 determines whether the packet transmission is appropriate based on the amount of tokens to be accumulated according to the target transmission rate for every candidate transmission timing. The candidate transmission timing includes timing when an acknowledgement transmitted from the communication terminal 30 is received with respect to the packets transmitted from the communication terminal 10 and timing when the timer value updated by the communication terminal 10 at each packet transmission executing timing expires.

With this configuration of the communication terminal 10, it becomes possible that one part of the multiple acknowledgement reception timing is used as the transmission executing timing and the rest is used as the transmission non-executing timing and the timer expiration is used as the transmission executing timing in place of the transmission non-executing timing. Accordingly, the transmission executing timing may be leveled, so that the packet transmission burstiness may be suppressed. In addition, the packet transmission amount is controllable based on the tokens, so that the packet transmission burstiness may be further suppressed. As a result, the possibility of causing buffer overflow in the bottleneck buffer is reducible, so that the transmission rate may be improved. Also, one part of the acknowledgement reception timing is used as the transmission executing timing and the timer expiration timing is also used as the transmission executing timing, so that the frequency of causing interruption processing may be suppressed as compared with a case where the transmission executing timing is controlled only by the timer. In other words, the processing load in the communication terminal 10 is may be reduced.

The controller 11 limits the amount of tokens, which are usable at one transmission executing timing, up to the maximum limit of token consumption at once.

This configuration of the communication terminal 10 allows the data amount of packets transmitted at once to be limited, so that the burstiness may be suppressed.

Also the controller 11 calculates a residual amount of tokens when an acknowledgement is received and when the timer expires.

This configuration of the communication terminal 10 allows the timing of calculating the residual amount of the tokens to be limited, so that the processing amount of the communication terminal 10 may be reduced.

The controller 11 calculates a target transmission rate based on the limit value of the congestion window which is set by the congestion control processing and the round trip time.

With this configuration of the communication terminal 10, the packet transmission being consistent with the congestion window may be achieved.

The controller 11 uses the total data amount of the packets, which have been already transmitted but whose acknowledgements have not been received yet, as the limit value of the congestion window.

With this configuration of the communication terminal 10, the packet transmission being consistent with the packet transmission in the existing TCP may be achieved.

Also, the timer manages the timer value as well as the response timeout (RTO). Accordingly, the timer may be shared. This allows the configuration of the communication terminal 10 to be simplified.

Second Embodiment

A second embodiment relates to a method of setting the "timer reference value" of the first embodiment. It is to be noted that the configuration of a communication terminal according to the second embodiment is basically same as that of the communication terminal 10 of the first embodiment. Accordingly, the description is given by using FIG. 7.

A controller 11 of a communication terminal 10 of the second embodiment sets a timer reference value based on a residual amount of tokens and a target transmission rate at transmission executing timing.

For example, the controller 11 calculates time that is desired for the amount of tokens to reach the transmission execution lower limit value based on the residual amount of the tokens at the transmission executing timing, the target transmission rate, and the "transmission execution lower limit value" and sets the calculated time as the timer reference value. The "transmission execution lower limit value" is a lower limit value of the data amount which is transmitted when it is determined that transmission is appropriate when the timer expires.

Here, the timer reference value may have a lower limit value (hereinafter, it is sometimes referred to as a "timer lower limit value").

Figure 13:
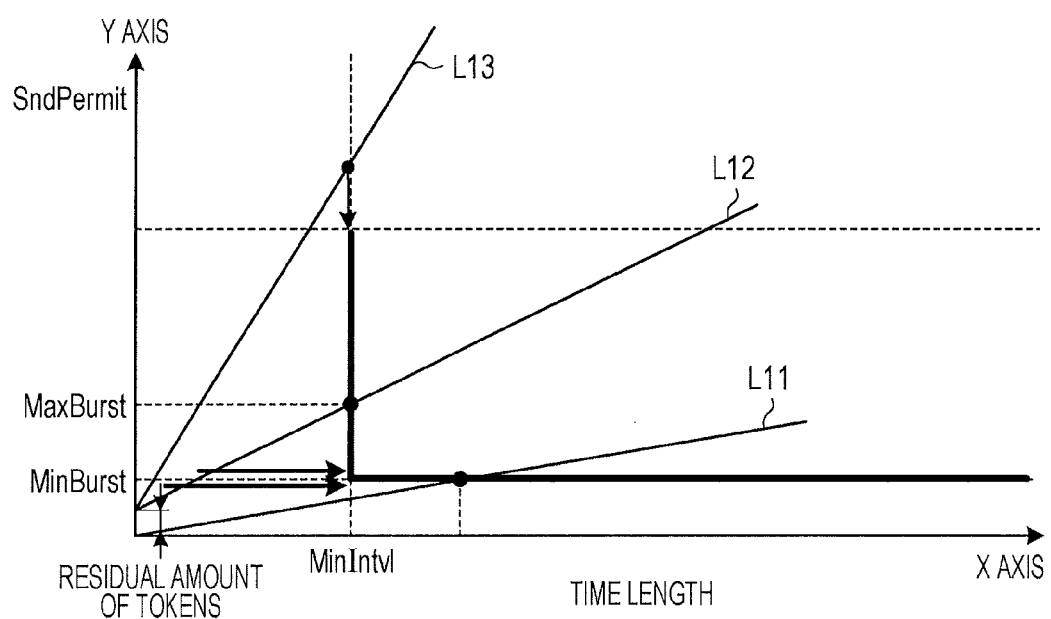
FIG. 13 is a graph for illustrating an example method of setting a timer reference value according to a second embodiment.

FIG. 13 is a graph for illustrating an example method of setting a timer reference value according to the second embodiment.

In FIG. 13, there are three straight lines whose target transmission rates (in other words, inclinations) are different from one another, or a straight line L11, a straight line L12, and a straight line L13. In FIG. 13, the X-axis is a time length and the Y-axis is an amount of tokens. The target transmission rate of the straight line L12 is larger than the target transmission rate of the straight line L11. The target transmission rate of the straight line L13 is larger than the target transmission rate of the straight line L12. In FIG. 13, MinIntvl is the above-described timer lower limit value. In FIG. 13, MinBurst is the above-described transmission execution lower limit value. Also, in FIG. 13, MaxBurst is the "maximum limit of token consumption at once" described in the first embodiment.

First of all, when an attention is paid to the straight line L11, the time when the token amount reaches the transmission execution lower limit value, or the X coordinate of an intersection between the straight line L11 and Y=MinBurst takes a larger value than MinIntvl. Accordingly, the controller 11 sets the time length in which the token amount receives the transmission execution lower limit value as the timer reference value under the situation equivalent to the straight line L11. When this timer reference value expires, the tokens are accumulated for the amount of the transmission execution lower limit value, so that the packets for the amount of the transmission execution lower limit value are transmitted.

Next, when an attention is paid to the straight line L12, the time when the token amount reaches the transmission execution lower limit value, or the X coordinate of an intersection between the straight line L12 and Y=MinBurst takes a smaller value than MinIntvl. Accordingly, the controller 11 sets the timer lower limit value (MinIntvl) as the timer reference value under the situation equivalent to the straight line L12. When this timer reference value expires, the tokens are accumulated for the amount of the tokens equivalent to the Y coordinate of an intersection between the straight line L12 and X=MinIntvl, so that the packets for that amount are transmitted.

Next, when an attention is paid to the straight line L13, the time when the token amount reaches the transmission execution lower limit value, or the X coordinate of an intersection between the straight line L13 and Y=minBurst takes a smaller value than minIntvl. Accordingly, the controller 11 sets the timer lower limit value (minIntvl) as the timer reference value under the situation equivalent to the straight line L13. When this timer reference value expires, the amount of tokens is equivalent to the Y coordinate of an intersection between the straight line L13 and X=minIntvl. However, the Y coordinate is a larger value than the maximum limit of token consumption at once (MaxBurst). Accordingly, the controller 11 transmits packets for the amount of the maximum limit of token consumption at once under the situation equivalent to the straight line L13.

As described above, according to the present embodiment, in the communication terminal 10, the controller 11 sets a timer value based on the residual amount of the tokens at the transmission executing timing and the target transmission rate. For example, the amount of data which is transmitted when it is determined that transmission is appropriate when the timer expires has a lower limit value (in other words, the time when the amount of token reaches to the "transmission execution lower limit value"). Then, the controller 11 calculates time that is desired for the amount of tokens to reach the transmission execution lower limit value based on the residual amount of tokens at the time transmission is executed, the target transmission rate, and the transmission execution lower limit value and sets the calculated time as a timer value.

This configuration of the communication terminal 10 does not allow the timer to expire under the situation where the packet transmission is not allowed. Accordingly, useless processing in the communication terminal 10 is may be avoided.

Also, the timer reference value has a lower limit value. Accordingly, the load of timer update processing may be reduced and thus the processing load of the communication terminal 10 may be reduced.

Third Embodiment

A third embodiment relates to control of accumulating tokens (in other words, tokens) and packet transmission amount within a unit period of a timer resolution (hereinafter, it may be referred to as "Tick") and control of accumulating tokens (in other words, tokens) when the unit period of the timer resolution terminates. In general, the timer resolution which is managed by software is lower as compared with a current communication speed (for example, packet rate). For example, Linux (a registered trademark) which is known as an open source OS normally has a resolution of approximately 1 to 10 ms. In contrast, in Ethernet (a registered trademark) with a gigabit, when a jumbo frame is not used, 1518 bytes are the maximum length. Accordingly, 800 or more packets may be transmitted for 1 ms. For example, when it is assumed that an allowable burst size (in other words, the maximum limit of token consumption at once) is 100 packets, there may be a case in Ethernet (a registered trademark) with a gigabit where the amount of tokens which are accumulated for 1 ms exceeds the allowable burst size (in other words, the maximum limit of token consumption at once). For this reason, in the third embodiment, the above-described control is performed. It is to be noted that the configuration of a communication terminal of the third embodiment is basically same as that of the communication terminal 10 of the first embodiment, and the description is given by using FIG. 7.

A controller 11 of a communication terminal 10 of the third embodiment allows a packet transmission amount, within the unit period of timer resolution (Tick), according to the accumulation of tokens up a "first threshold" and the residual amount of tokens corresponding to the "first threshold". The "first threshold" has a value larger than the maximum limit of token consumption at once. On the other hand, the controller 11 does not allow the accumulation of the tokens which exceeds the threshold of the maximum limit of token consumption at once when the unit period of the timer resolution (Tick) terminates. In other words, the controller 11 allows the accumulation of tokens which is equal to or larger than the maximum limit of token consumption at once and equal to or smaller than first threshold within the unit period of the timer resolution (Tick) but allows the accumulation of tokens up to the maximum limit of token consumption at once when the unit period of the timer resolution (Tick) terminates.

Here, the controller 11 may use a smaller one of the amount of tokens per unit period (Tick) and the predetermined "accumulation upper limit value" as a "first threshold".

Figure 14:
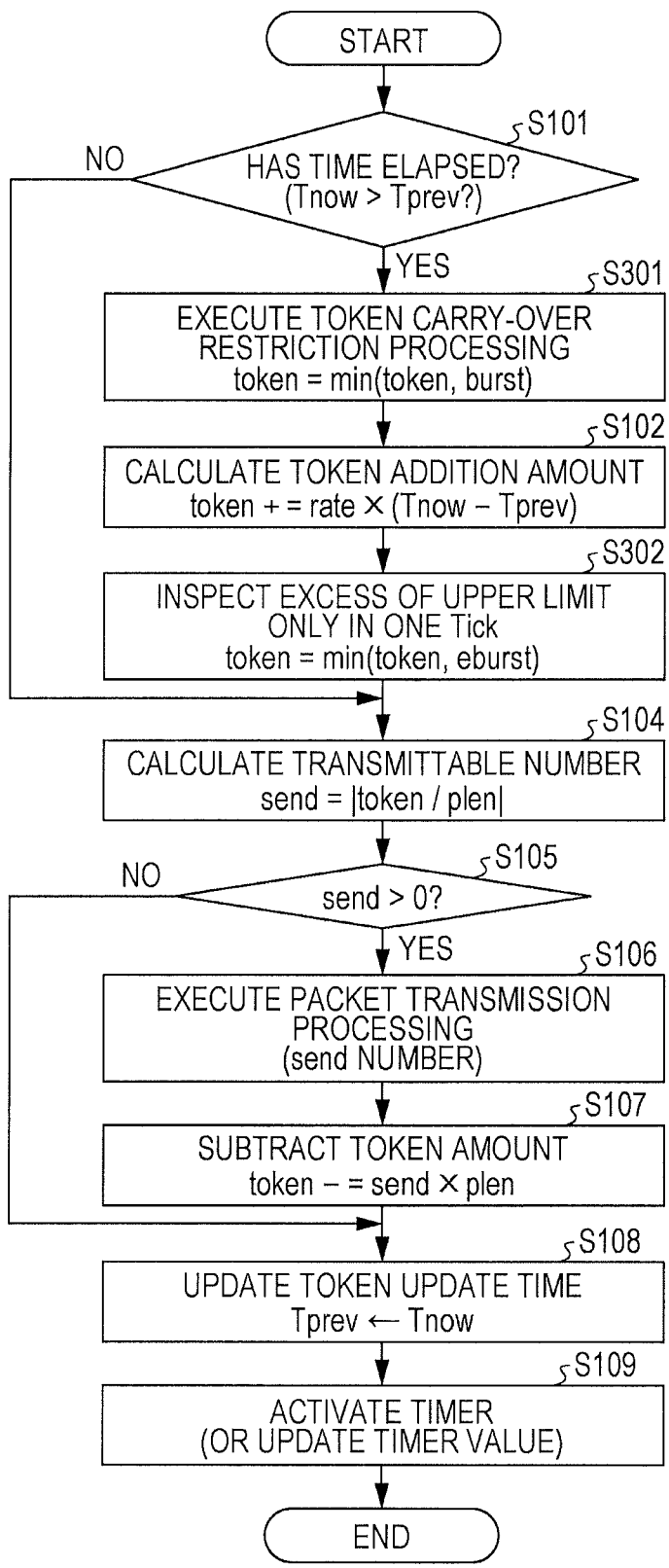
FIG. 14 is a flowchart for illustrating an example processing operation of a communication terminal according to a third embodiment.

FIG. 14 is a flowchart for illustrating an example processing operation of the communication terminal according to the third embodiment.

The controller 11 of the communication terminal 10 of the third embodiment starts the flow of FIG. 14 when an acknowledgement is received.

When time has elapsed (Yes at operation S101), the controller 11 executes token carry-forward restriction processing (operation S301). In other words, the controller 11 uses a smaller one of the token residual amount (token) at the previous update time and the maximum limit of token consumption at once (burst) as a token amount (token) at the current time point.

Then, the controller 11 calculates a token addition amount (token+) (operation S102).

After that, the controller 11 calculates a virtual token amount by adding the calculated token addition amount to the token amount (token) at the current time point.

Thereafter, the controller 11 executes the upper limit exceeding inspection which is limited in 1 Tick (operation S302). In other words, the controller 11 uses a smaller one of the calculated virtual token amount (token) and the first threshold (eburst) as an actual token residual amount.

As described above, according to the third embodiment, in the communication terminal 10, the controller 11 allows a packet transmission amount according to the accumulation of tokens which is larger than the maximum limit of token consumption at once of the transmission rights and up to the first threshold and the residual amount of tokens corresponding to the first threshold within the unit period (Tick) of the timer resolution.

With this configuration of the communication terminal 10, the packet transmission with the data amount exceeding the maximum limit of token consumption at once is allowed in the packet transmission which is caused when an acknowledgement is received within the unit period of the timer resolution, so that the transmission rate may be increased.

Also, the controller 11 does not allow the accumulation of tokens exceeding the maximum limit of token consumption at once when the unit period of the timer resolution terminates.

This configuration of the communication terminal 10 keeps the excessively allocated tokens from being carried-forward across the unit periods. Accordingly, increase in the burstiness may be suppressed.

Also, the controller 11 uses a smaller one of the amount of tokens per unit period and the predetermined accumulation upper limit value as the first threshold.

With this configuration of the communication terminal 10, a risk of excessively accumulating tokens when limitation is made only by the accumulation upper limit value, but the first threshold may be limited to be equivalent to the target transmission rate. Accordingly, excessive accumulation of tokens may be suppressed.

Fourth Embodiment

A fourth embodiment relates to control of a packet transmission amount. For example, when an amount of packets, which is equivalent to the maximum limit of token consumption at once is transmitted at once under a situation where acknowledgements arrive with a relatively high frequency, there may be a situation where there is no residual amount of tokens when the following acknowledgement is received and thus a packet is unable to be transmitted anew. This type of situation causes an increase in the burstiness under the situation where acknowledgements are stably transmitted. For this reason, in the fourth embodiment, a packet transmission amount is controlled. It is to be noted that the configuration of the communication terminal according to the fourth embodiment is basically same as that of the communication terminal 10 of the first embodiment, and the description is given by using FIG. 7.

A controller 11 of a communication terminal 10 of the fourth embodiment transmits the certain number of packets, the number equal to a quotient obtained by diving a first data amount by a packet unit data amount in a case where a first condition is met when an acknowledgement is transmitted. The first condition is a case where a first data value obtained by multiplying a reception-acknowledged data amount indicated by the acknowledgement by a ratio of the target transmission rate to the actual transmission rate is smaller than the maximum limit of token consumption at once of tokens.

Here, when there is a residual as a result of diving the first data amount by the packet unit data amount, the controller 11 may increment the reception-acknowledged data amount at the next receive timing of acknowledgement by the residual.

Figure 15:
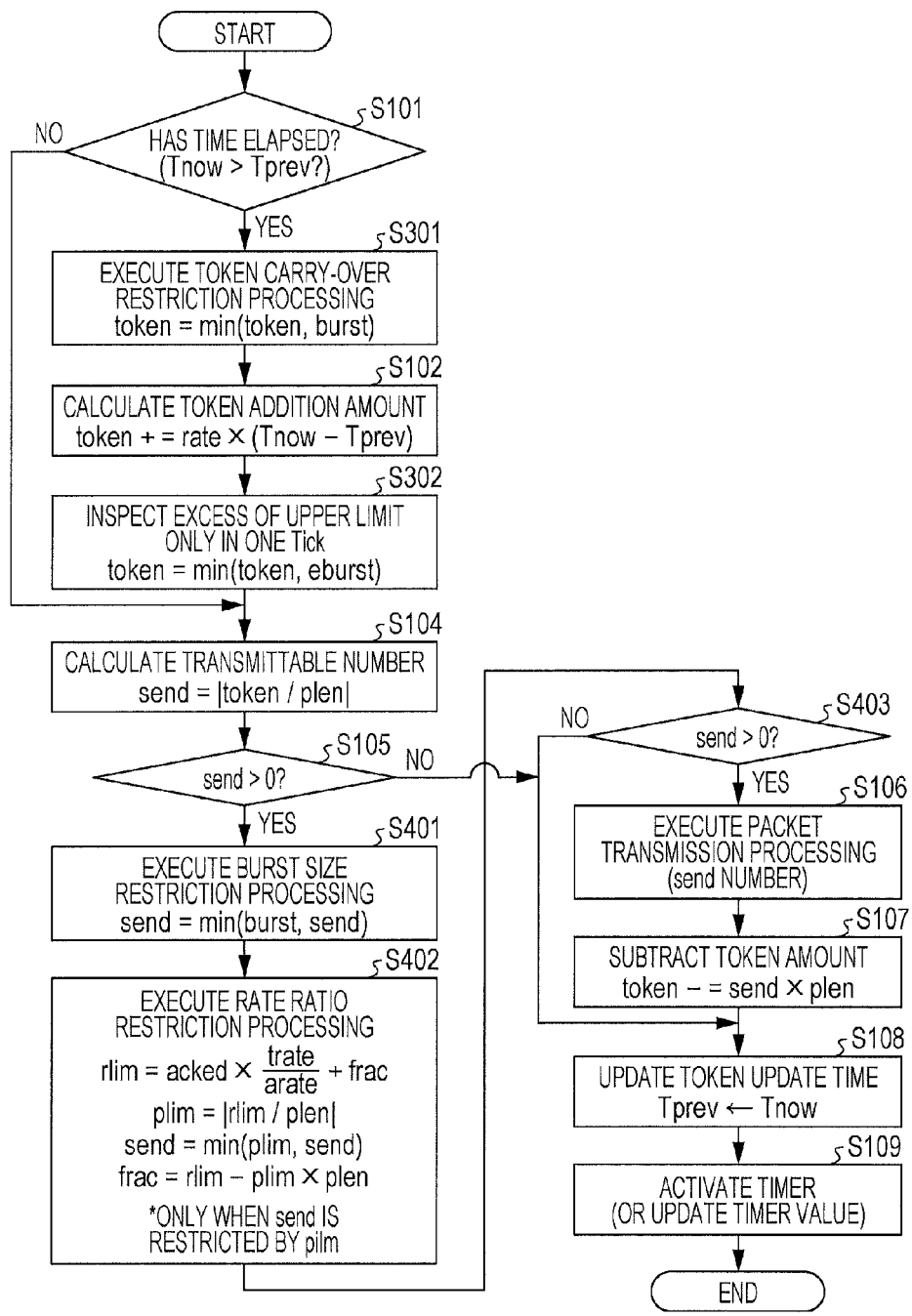
FIG. 15 is a flowchart for illustrating an example processing operation of a communication terminal according a fourth embodiment.

FIG. 15 is a flowchart for illustrating an example processing operation of the communication terminal of the fourth embodiment.

The controller 11 of the communication terminal 10 of the fourth embodiment starts the flow of FIG. 15 when the acknowledgement is received.

When a transmittable number (send) is larger than 0, in other words, when a transmittable number is equal to or larger than 1 (Yes at operation S105), the controller 11 executes burst size restriction processing (operation S401). In other words, the controller 11 uses a smaller one of the maximum limit of token consumption at once (burst) and the transmittable number (send) as a second transmittable number (send).

Then, the controller 11 executes rate ratio restriction processing (operation S402). In other words, the controller 11 calculates a value (rlim) which is obtained by multiplying the ratio of the target transmission rate to the actual transmission rate to the reception-acknowledged data amount (acked) indicated by the acknowledgement and adding the residual (frac) when the previous acknowledgement is received to that multiplication result. After that, the controller 11 uses the quotient which is obtained by dividing the value (rlim) by the packet length (plen) as a third transmittable number (plim). After that, the controller 11 uses a smaller one of the third transmittable number (plim) and the second transmittable number (send) as an actual transmittable number (send).

Then, the controller 11 determines whether the actual transmittable number (send) is larger than 0 (operation S403).

Figure 16:
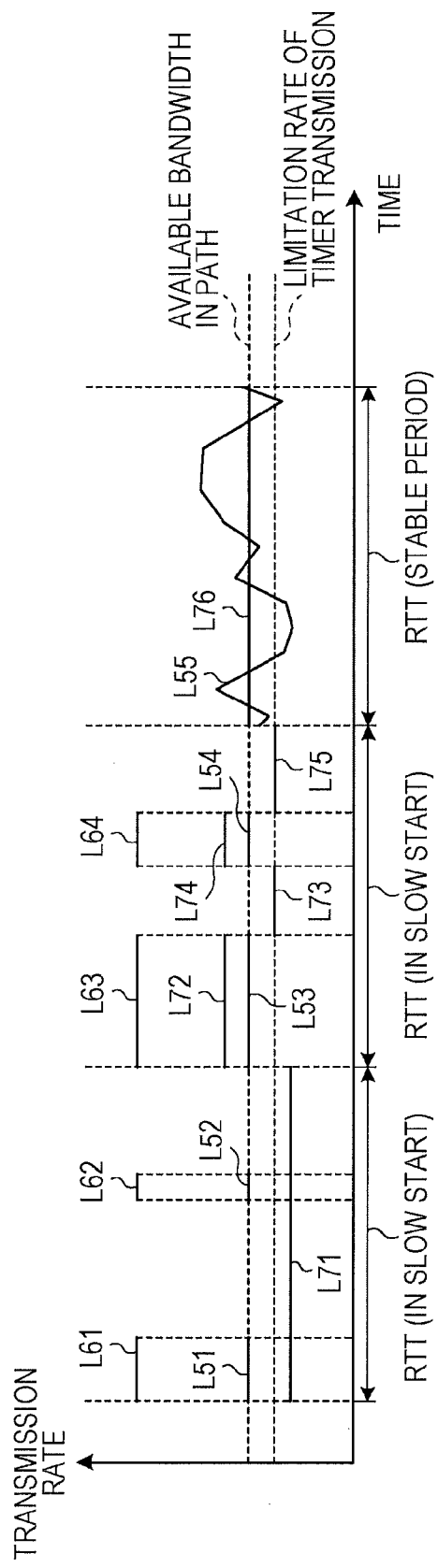
FIG. 16 is a diagram for illustrating a state where a transmission rate changes over time.

Here, the description is given to changes of the transmission rate over time when the first to fourth embodiments are applied. FIG. 16 is a diagram for illustrating a state where a transmission rate changes over time. FIG. 16 illustrates three RTTs. The left and center RTTs in FIG. 16 indicate RTTs in a slow start mode and the right RTT indicates a RTT in a stable period, or state where acknowledgements reach continuously. Also, in FIG. 16, line segments L51, L52, L53, L54, and L55 indicate rates of acknowledgements (or ACK rates). In addition, line segments L61, L62, L63, and L64 indicate transmission rates of packets by a conventional method which does not use packet shaping. Moreover, line segments L71, L72, L73, L74, L75, and L76 indicate transmission rates when the techniques described in the first to fourth embodiments are applied. With the conventional method which does not use the packet shaping, the transmission rate of packets doubles the ACK rate.

In contrast, in the left RTT of FIG. 16, during a period in which an acknowledgement is received (in other words, periods corresponding to the line segments L51 and L52), packets are transmitted at a rate lower than the ACK rate by the packet shaping. Also, in the left RTT of FIG. 16, a period in which an acknowledgement is not received (in other words, periods which do not overlap with the periods corresponding to the line segments L51 and L52), packets are transmitted when a timer is started. In other words, the transmission timing is capable of being dispersed, so that the burstiness may be suppressed.

In addition, in the center RTT of FIG. 16, during a period in which an acknowledgement is received (in other words, periods corresponding to the line segments L53 and L54), packets are transmitted at a rate slightly higher than the ACK rate. On the other hand, in the center RTT of FIG. 16, a period in which an acknowledgement is not received (in other words, periods which do not overlap with the periods corresponding to the line segments L53 and L54), a packet transmission rate is smaller than the original rate. This is caused by the limitation of the timer resolution and the limitation of the data amount to be transmitted for one time. However, in the center RTT of FIG. 16 as a whole, the packet transmission rate is leveled to a proper transmission rate and the suppression of the burstiness is achieved.

Also, in the stable period like the right RTT of FIG. 16, ACK is received continuously. The ACK rate may be changed due to various variation factors. However, the techniques described in the first to fourth embodiments are applied, so that the packet transmission rate may be leveled (see, the line segment L76).

As described above, according to the present embodiment, when the first data value is smaller than the maximum limit of token consumption at once of the tokens, the controller 11 in the communication terminal 10 transmits the number of packets which is equal to the quotient obtained by dividing the first data amount by the packet unit data amount. The first data amount is a value which is obtained by multiplying the ratio of the target transmission rate to the actual transmission rate to the reception-acknowledged data amount indicated by the acknowledgement when the acknowledgement is received.

This configuration of the communication terminal 10 may suppress the increase in the burstiness. In other words, when an amount of packets, which is equivalent to the temporal upper limit base value, are transmitted all at once under the situation where acknowledgements arrive with a relatively high frequency, there may be a situation where there is no residual amount of tokens when the following acknowledgement is received and thus a packet is unable to be transmitted anew. This type of situation causes an increase in the burstiness under the situation where acknowledgements are stably transmitted. For this reason, the increase in the burstiness is suppressed with the configuration of the communication terminal 10. This becomes particularly effective in a case where the accumulation of tokens exceeding the maximum limit of token consumption at once is allowed similarly to the third embodiment. In a case where communications are performed at a high transmission rate so that a large amount of acknowledgements arrives at same time, if it is measured by a timer managed by an OS or the like, but strictly speaking, with a time difference, when the packet with the data amount equivalent to the temporal use upper limit base value is transmitted for each of the acknowledgements, which may easily cause a situation where the packets are transmitted all together in the former part and no token remains in the latter part. For this reason, when the acknowledgement is received, the transmission data amount is limited by the value which is obtained by multiplying the ratio of the target transmission rate to the actual transmission rate to the reception-acknowledged data amount indicated by the acknowledgement, so that the number of packets to be transmitted for each acknowledgement may be stabilized.

Accordingly, the increase in the burstiness of the timer resolution may be suppressed within the unit period of the timer resolution.

Also, when a residual is caused as a result of dividing the first data amount by the packet unit data amount, the controller 11 adds the residual to the reception-acknowledged data amount at the next receive timing of the acknowledgement.

With this configuration of the communication terminal 10, the residual amount of tokens which are shorter than the packet length may be effectively utilized, so that the transmission rate may be brought closer to the target transmission rate.

[Other]

[1] The description is given in the first to fourth embodiments based on the assumption that the communication terminal 10 is wired via the network 50, but the embodiment is not limited to this assumption. The communication terminal 10 may be connected to the network 50 wirelessly.

[2] The components of each part illustrated in the first to fourth embodiments do not necessarily have to be physically configured as illustrated. In other words, specific configurations how to disperse and integrate the parts are not limited to the ones illustrated and all or one part thereof may be configured by being dispersed and integrated functionally or physically in any unit according to various kinds of loads or using situations.

Furthermore, all or any part of each kind of processing function performed in each device may be executed on a central processing unit (CPU) or a microcomputer such as a micro processing unit (MPU) or a micro controller unit (MCU). Also, all or any part of each processing function may be executed on a program which executes analysis by CPU or a microcomputer such as MPU or MCU, or hardware by a wired logic.

The communication terminals of the first to fourth embodiments may be achieved by the following hardware configuration.

Figure 17:
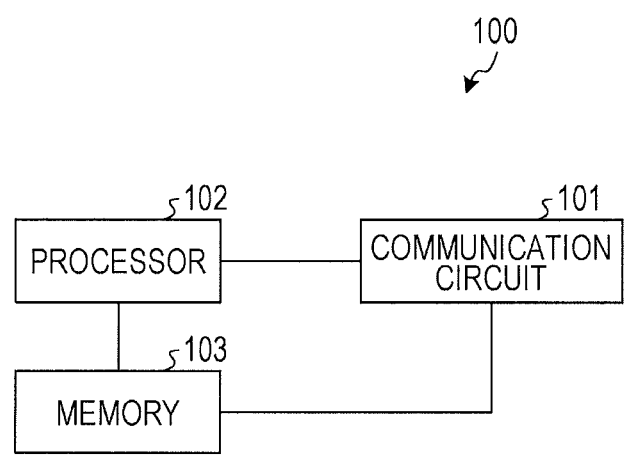
FIG. 17 is a diagram illustrating an example hardware configuration of a communication terminal.

FIG. 17 is a drawing for illustrating an example communication terminal and an example hardware configuration. As illustrated in FIG. 17, a communication terminal 100 includes a communication circuit 101, a processor 102, and a memory 103.

As one example, the processor 102 includes CPU, a digital signal processor (DSP), a field programmable gate array (FPGA) and the like. Also, as one example, the memory 103 includes a random access memory (RAM) such as a synchronous dynamic random access memory (SDRAM), a read only memory (ROM), a flash memory, and the like.

Then, the processing functions performed in the communication terminals 10 in the first to the fourth embodiments may be achieved by executing programs stored in each memory such as a non-volatile recording medium on a processor provided in a communication device. In other words, the programs dealing each processing executed by the controller 11 may be recorded in the memory 103 and each program may be executed by the processor 102. Also, the processing executed by the controller 11 may be executed by sharing the burden among multiple processors such as base band CPU and application CPU. In addition, the transmitter 13 and the receiver 14 are achieved by the communication circuit 101. The transmission buffer 12 is achieved by the memory 103.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A communication terminal configured to control a packet transmission amount based on the number of packets transmittable to a destination device without receiving an acknowledgement signal (ACK) transmitted from the destination device to indicate its acceptance for the packets transmitted from the communication terminal, the communication terminal comprising:
   a processor configured to execute a procedure, the procedure comprising:
   determining whether it is appropriate timing for packet transmission, based on an amount of tokens which are accumulated according to a target transmission rate, the transmission timing including timing when receiving the ACK and timing when a timer value updated at each timing of the packet transmission executed in the communication terminal expires; and
   transmitting a packet at the transmission timing in which it is determined that transmission is appropriate.

2. The communication terminal according to claim 1, wherein the timer value is set based on a residual amount of the tokens at the transmission executing timing and the target transmission rate.

3. The communication terminal according to claim 2, wherein the amount of the tokens is calculated in any of a case where the ACK is received, and a case where the timer expires.

4. The communication terminal according to claim 3, wherein, within a unit period of a timer resolution, the packet is transmitted according to an accumulation of the tokens up to a first threshold larger than a maximum limit of token consumption at once of the tokens and a residual amount of the tokens corresponding to the first threshold, and
   wherein, when the unit period expires, the accumulation of the tokens exceeding the maximum limit of token consumption at once is not allowed.

5. The communication terminal according to claim 4, wherein a smaller one of the amount of the tokens in the unit period and a predetermined accumulation upper limit value is used as the first threshold.

6. The communication terminal according to claim 2, wherein
   a data amount transmitted if it is determined that transmission is appropriate when the timer expires has a lower limit value,
   time desired for the amount of the tokens to reach the lower limit value is calculated based on the residual amount of the tokens at the transmission executing timing, the target transmission rate, and the lower limit value, and
   the timer is configured to expire at the calculated time.

7. The communication terminal according to claim 2, wherein the timer value has a lower limit value.

8. The communication terminal according to claim 1, wherein, in a case where a data amount obtained by multiplying a ratio of the target transmission rate to an actual transmission rate by a reception-acknowledged data amount indicated by the acknowledgement is smaller than the maximum limit of token consumption at once of the tokens at a time when the acknowledgement is received, the communication terminal transmits packets of a number equal to a quotient obtained by dividing the first data amount by a packet unit data amount.

9. The communication terminal according to claim 8, wherein, when a residual is obtained as a result of the division of the first data amount by the packet unit data amount, the residual is added to the reception-acknowledged data amount at the next receive timing of the acknowledgement.

10. The communication terminal according to claim 1, wherein the target transmission rate is calculated based on round trip time and the number of packets transmittable to a destination device without receiving the acknowledgement signal (ACK) transmitted from the device to indicate its acceptance for the packets transmitted from the communication terminal.

11. The communication terminal according to claim 1, wherein a limit value of the window to the packet transmission amount is replaced to the value which shown by the total amount of data in the packet already transmitted by the communication terminal and whose ACK has not been received yet.

12. The communication terminal according to claim 1, wherein a timer managing the timer value further manages a response timeout.

13. A computer-readable recording medium included in a communication terminal configured to control a packet transmission amount based on the number of packets transmittable without waiting for an acknowledgement signal (ACK) transmitted from a device to indicate that a packet transmitted from the communication terminal has been received correctly at the device, the computer-readable recording medium storing a program that causes a computer to execute a procedure, the procedure comprising:
　　determining whether it is appropriate timing for packet transmission, based on an amount of tokens which are accumulated according to a target transmission rate, the transmission timing including timing when receiving the ACK and timing when a timer value updated at each timing of the packet transmission executed in the communication terminal expires; and
　　transmitting a packet at the transmission timing in which it is determined that transmission is appropriate.

14. A communication method of a communication terminal configured to control a packet transmission amount based on the number of packets transmittable without waiting for an acknowledgement signal (ACK) transmitted from a device to indicate that a packet transmitted from the communication terminal has been received correctly at the device, the communication method comprising:
　　determining whether it is appropriate timing for packet transmission, based on an amount of tokens which are accumulated according to a target transmission rate, the transmission timing including timing when receiving the ACK and timing when a timer value updated at each timing of the packet transmission executed in the communication terminal expires; and
　　transmitting a packet at the transmission timing in which it is determined that transmission is appropriate.

\* \* \* \* \*